(12) United States Patent
Rosychuk

(10) Patent No.: US 8,214,685 B2
(45) Date of Patent: Jul. 3, 2012

(54) RECOVERING FROM A BACKUP COPY OF DATA IN A MULTI-SITE STORAGE SYSTEM

(75) Inventor: Shaun Rosychuk, Sherwood Park (CA)

(73) Assignee: Hewlett-Packard Development Company, L.P., Houston, TX (US)

( * ) Notice: Subject to any disclaimer, the term of this patent is extended or adjusted under 35 U.S.C. 154(b) by 360 days.

(21) Appl. No.: 12/262,679

(22) Filed: Oct. 31, 2008

(65) Prior Publication Data

US 2010/0115215 A1 May 6, 2010

(51) Int. Cl.
G06F 11/00 (2006.01)
(52) U.S. Cl. ........... 714/6.3; 714/6.1; 714/6.31; 714/42
(58) Field of Classification Search .......... 714/5, 6, 714/7, 42, 5.1, 6.1, 6.3, 6.31, 6.32
See application file for complete search history.

(56) References Cited

U.S. PATENT DOCUMENTS

| | | | |
|---|---|---|---|
| 6,446,175 B1 * | 9/2002 | West et al. | 711/162 |
| 6,728,736 B2 * | 4/2004 | Hostetter et al. | 1/1 |
| 7,308,545 B1 * | 12/2007 | Kekre et al. | 711/162 |
| 7,370,228 B2 * | 5/2008 | Takahashi et al. | 714/6 |
| 7,467,168 B2 * | 12/2008 | Kern et al. | 1/1 |
| 7,627,729 B2 * | 12/2009 | Bartfai et al. | 711/162 |
| 7,725,579 B2 * | 5/2010 | Cook et al. | 714/5 |
| 7,734,883 B2 * | 6/2010 | Spear et al. | 711/162 |
| 8,020,037 B1 * | 9/2011 | Schwartz et al. | 714/6.3 |
| 2005/0160305 A1 * | 7/2005 | Soejima | 714/2 |
| 2008/0172572 A1 * | 7/2008 | Beardsley et al. | 714/6 |

OTHER PUBLICATIONS

Hewlett-Packard Development Company, L.P., "HP OpenView Storage Data Protector Zero Downtime Backup Concepts Guide," Manual Edition: Jul. 2006, 202 pages (Jul. 2006).
Hewlett-Packard Development Company, L.P., "HP StorageWorks Oracle Zero Downtime Backup Solution Using the XP Disk Array with XP External Storage and Data Protector on HP-UX," implementation guide, 48 pages (Apr. 2006).

* cited by examiner

*Primary Examiner* — Robert Beausoliel, Jr.
*Assistant Examiner* — Joseph D Manoskey

(57) ABSTRACT

To make available a backup copy of source data in a multi-site storage system, the source data is provided at a first storage site and an operational copy of the source data is provided at a second storage site. In response to a request to create a backup copy of the source data, the backup copy of the source data is produced at each of the first and second storage sites. In response to failure that causes the first storage site to be unavailable, recovery of a version of the source data is enabled based on accessing the backup copy of the source data at the second storage site, and accessing the operational copy of the source data at the second storage site.

20 Claims, 3 Drawing Sheets

RECOVERING FROM A BACKUP COPY OF DATA IN A MULTI-SITE STORAGE SYSTEM

BACKGROUND

Many data storage environments at various enterprises (e.g., companies, educational organizations, government agencies, etc.) operate without downtime on a 24/7 basis (available 24 hours a day, seven days a week). To enable recovery of data in case of failure, data backups are typically performed.

Traditional backup techniques involve backing up data to storage tape. For large storage systems, however, backing up to tape may not be viable, since there can be a relatively large amount of data that has to be backed up, which may cause an application (e.g., database application) in the storage system to be taken offline for a relatively long period of time. Taking the database application offline can cause disruption to the operation of the system, which is undesirable.

To address this issue, a zero downtime backup (ZDB) technique has been proposed, in which instead of backing up directly to storage tape, the data is backed up to a disk-based storage subsystem. Data writes to a disk-based storage subsystem is typically much faster than data writes to a tape storage device. By performing backups to a disk-based storage device, the database application would not have to be taken offline for a long period of time, such that there would be little impact on the performance of the database application. After the backup data has been written to the disk-based storage subsystem, the backup data can then be streamed to tape storage device without further interruption of the database application, or alternatively, the backup data can just be kept in the disk-based storage subsystem.

To provide additional data protection and to ensure high availability of a storage system, a clustered arrangement may be employed. The clustered arrangement includes a cluster of multiple storage sites. In case of failure of one storage site, failover can be performed to another storage site to enable continued operation. However, managing backups in a clustered environment can increase complexity. If not managed properly, then a recovery operation may not be possible or cannot be achieved in a timely manner. This can reduce availability of the data contained in the clustered environment.

BRIEF DESCRIPTION OF THE DRAWINGS

Some embodiments of the invention are described, by way of example, with respect to the following figures.

DETAILED DESCRIPTION

Figure 1:
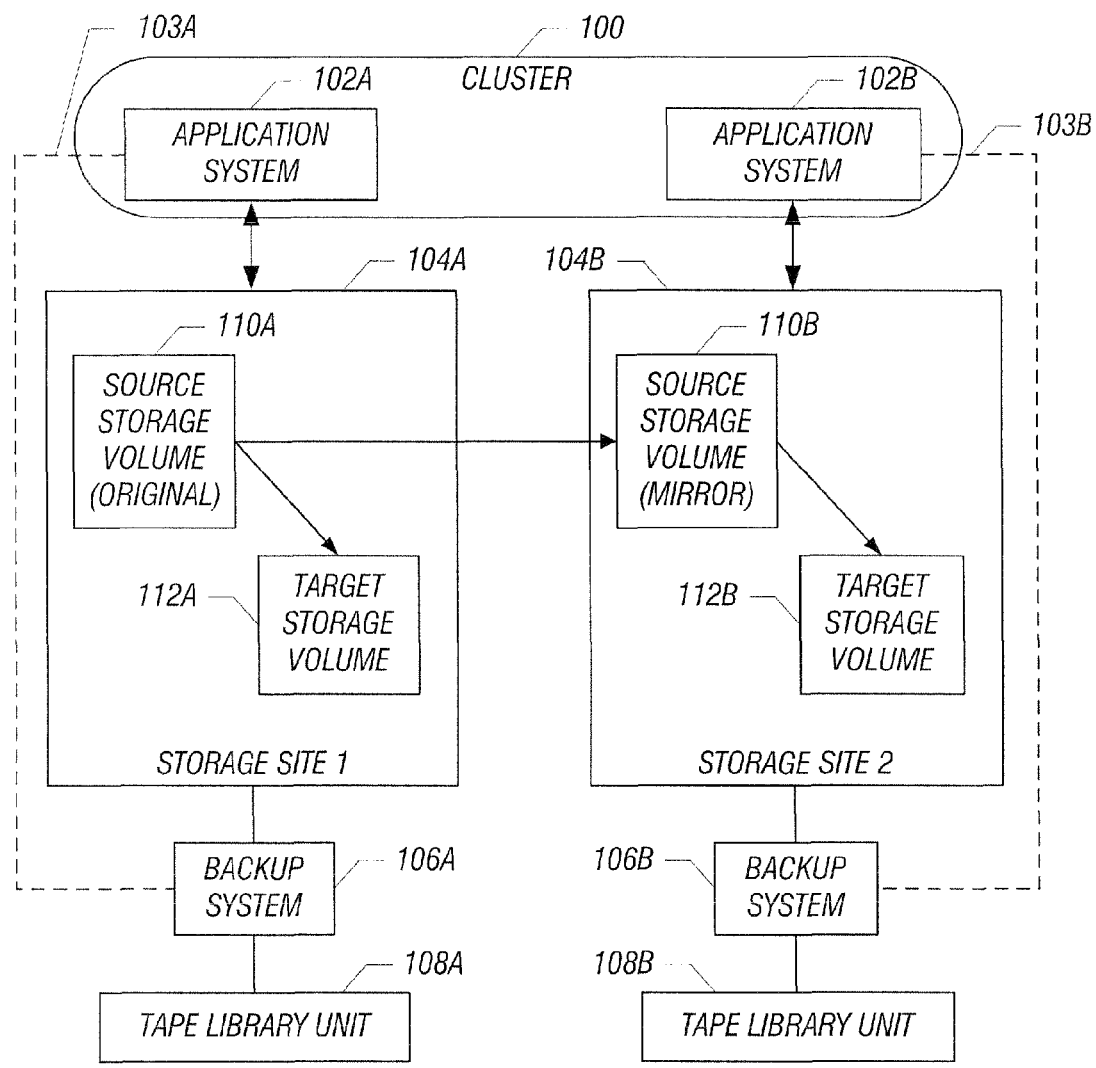
FIG. 1 is a block diagram of an exemplary arrangement in which an embodiment of the invention is incorporated.

FIG. 1 illustrates a clustered arrangement (multi-site storage system) that includes a cluster 100 of application systems 102A and 102B. The application systems 102A and 102B are connected to respective storage sites 104A and 104B. Each of the application systems 102A and 102B runs a software application that is capable of accessing data stored in a respective storage site 104A or 104B. In one example, the software application in each application system 102A and 102B can be a database application for managing databases stored in the corresponding storage site.

A "storage site" refers to a storage subsystem having a collection of one or more storage devices for storing data. In one example, a storage site can be implemented as a storage array (an array of interconnected storage devices). Alternatively, a storage site can include a storage area network (SAN) of storage devices. The storage devices contained in the storage sites 104A and 104B can be disk-based storage devices. Alternatively, the storage devices can be semiconductor storage devices, such as flash memory. Generally, the storage devices that are part of the storage sites 104A and 104B have higher access speeds than tape storage devices that store data on storage tapes.

Although just two storage sites are depicted in FIG. 1, it is noted that a system can include more than two storage sites.

As further depicted in FIG. 1, backup systems 106A and 106B are also connected to respective storage sites 104A and 104B. Each backup system contains backup software to manage data backup at each respective storage site 104A or 104B. In some implementations, a tape library unit 108A or 108B is connected to a respective backup system 106A or 106B. The tape library unit 108A or 108B includes one or more tape storage devices that can store data on storage tapes. The backup system 106A or 106B can copy backup data from a storage site 104A or 104B to the corresponding tape library unit 108A or 108B. The backup systems 106A and 106B can communicate control messages over respective networks 103A and 103B with the application systems 102A and 102B.

From the perspective of the application system 102A, the storage site 104A is a primary storage site, and the storage site 104B is a secondary storage site. The "primary" storage site is the storage site used by the application system 102A to read and write data when the primary storage site is available. However, in case of failure or some other event that causes the primary storage site to become unavailable, failover can occur from the primary storage site to the secondary storage site such that the application system 102A can continue to read and write data to the secondary storage site.

Although reference is made to the storage site 104A as being the primary storage site and the storage site 104B as being the secondary storage site for the application system 102A, it is noted that from the perspective of the application system 102B, the storage site 104B can be the primary storage site and the storage site 104A can be the secondary storage site. In this case, failure of the primary storage site 104B would cause failover to the secondary storage site 104A.

In an implementation with more than two storage sites (e.g., three storage sites A, B, and C), then a "circular" failover arrangement can be provided. For example, storage site B can be the secondary (failover) storage site for storage site A, storage site C can be the secondary (failover) storage site for storage site B, and storage site A can be the secondary (failover) storage site for storage site C.

The ensuing discussion assumes that the storage site 104A is the primary storage site (for application system 102A), and the storage site 104B is the secondary (failover) storage site. The storage site 104A stores original source data for the application system 102A, where the original source data is represented as an (original) source storage volume 110A in FIG. 1. A "storage volume" refers to a logical collection of data that can be stored on physical storage device(s). Although just one source storage volume is depicted in FIG. 1 at each storage site, it is noted that a storage site can store multiple storage volumes.

To provide failure protection and high availability, in case of failure, failover can occur from storage site 104A to storage site 104B. To enable such failover while continuing to have access to the source data, an operational copy of the original source storage volume 110A is maintained as a source storage volume 110B in the secondary storage site 104B. An "operational copy" of source data refers to a replica of the data that is maintained at a backup location, such that data operations can continue with the operational copy of the source data in case the original source data becomes unavailable. Note that an "operational copy" of source data is different from "backup data." Although backup data is in one sense a copy of the source data at some point in time, note that the backup data will become out-of-date with the source data as time progresses and data writes occur to the source data. On the other hand, with an operational copy of the source data, as the source data changes, the operational copy of the source data also changes in a synchronized manner. In some embodiments, the operational copy of the source data is referred to as a mirror copy of the data.

Once failover occurs in the context of FIG. 1 from primary storage site 104A to secondary storage site 104B, then the application system 102A can access the mirror source storage volume 110B instead of the original source storage volume 110A.

In addition to failover support between a primary storage site and a secondary storage site, the system according to some embodiments also creates backup copies of the source data on the storage sites 104A and 104B. The backup copies of data are used for data recovery, in case of failure or corruption of the original source storage volume 110A and mirror source storage volume 110B at the primary and secondary storage sites, respectively.

In accordance with some embodiments, to enable high availability of backup data, whenever a request is made to create a backup copy of the original source storage volume 110A, a backup copy of the source storage volume is produced in each of the storage sites 104A and 104B. Thus, as depicted in FIG. 1, a target (backup) storage volume 112A is created locally as a backup copy of the original source storage volume 110A in the primary storage site 104A, while a target (backup) storage volume 112B (backup copy) of the mirror source storage volume 110B is created locally in the secondary storage site 104B. Effectively, a local replica is created of the local version of the source storage volume (110A or 110B in respective storage site 104A or 104B) in response to a request to perform backup of the original source storage volume. The request to perform backup of the original source storage volume 110A can be made by the backup system 106A, for example, in response to a user request or in response to some other event (periodic backup, backup due to occurrence of a fault, etc.).

Note that the backup copy (target storage volume) of the source data (source storage volume) is created on the storage devices of the respective storage site 104A or 104B. Since the storage devices of the storage site 104A or 104B are relatively fast storage devices (e.g., disk-based storage devices or semiconductor storage devices), the backup operation can be performed relatively fast. As a result, if the software application in the application system 102A has to be taken offline to perform the backup, the amount of time that the software application of the application system 102A is offline is relatively short.

In other implementations, note that a "hot" or "online" backup can be performed in which the software application of the application system 102A remains online while the backup copying is proceeding. To support online backup, logs would have to be created to track write operations of the software application during the time that the backup operation is proceeding. This log is then used (replayed) to apply any modifications of data contained in the source storage volume when the backup copy has completed.

Since backup copies of the source data are present in both the primary storage site 104A and the secondary storage site 104B, when a failover occurs from storage site 104A to 104B, the application system 102A can continue to access both the source data (source storage volume 110B) as well as the backup copy (target storage volume 112B) in the secondary storage site 104B. Thus, if the application system 102A desires to perform data recovery after failover, both the target storage volume 112B and the backup storage volume 112B in the storage site 104B can be accessed to perform the data recovery. This ensures high availability of both the source data and the backup copy of the source data such that data operations can continue after failover in a clustered environment, where the data operations include normal read/write operations as well as recovery operations.

The backup copy (target storage volume 112A or 112B) of the source data (110A or 110B) can be a point-in-time representation (or snapshot) of the source data at a particular point in time. A snapshot of the source data can be created when a write occurs. Prior to modification of the source data, a snapshot of the source data can be taken. Many snapshots can be taken over time as writes are received at the storage site. If recovery of data is desired, then one or more of the snapshots can be used to recover data back to a prior state, such as before a point in time when corruption or data loss occurred. Note that the snapshot can store just the changed data at any particular point in time, such that the snapshot does not have to store the entirety of the source data. This allows backup copies of data to be created in a much faster fashion.

Alternatively, the backup storage volumes 112A and 112B can be full copies (clones or mirrors) of the source storage volumes 110A and 110B.

In some implementations, the arrangement depicted in FIG. 1 implements zero downtime backup (ZDB), in which minimal downtime or impact is provided on the application system (102A or 102B) during data backup. ZDB is enabled by creating backup copies of source data in high-speed storage device(s). Also, instant recovery (IR) can be provided for restore data from the backup copies of source data, where restore times are on the order of minutes rather than hours.

Backup data is created during a backup data session controlled by a backup system (106A or 106B). In accordance with some embodiments, a backup data session, as managed by a corresponding backup system 106A or 106B, creates objects that allow data to be restored regardless of which storage site is currently active. The objects that are created to enable such restoration regardless of which storage site is currently active includes the creation of backup copies (target storage volumes 112A and 112B) on each of the primary storage site and secondary storage site, as well as the maintenance of an operational copy of the original source data (e.g., 110B that is a copy of 110A in FIG. 1) on the secondary storage site.

For a restore operation to proceed, both the source storage volume and the target storage volume have to be available. Techniques according to some embodiments ensure that both the source storage volume (source data) and the target storage volume (backup copy of the source data) are available at both the primary storage site and the secondary storage site such that recovery operations can proceed regardless of which storage site the restore operation is run from.

Another feature according to some embodiments is that, for a given source data, the configuration for backup sessions on either the primary storage site or secondary storage site are the same. Thus, a backup session that was scheduled on the primary storage site prior to failover would not have to be reconfigured when run on the secondary storage site after failover. The configuration of a backup session includes various characteristics associated with backing up data, such as RAID (Redundant Array of Inexpensive Disks) level, type of copying (full copy or copy of just the changed data), schedule (how frequently backups are performed), retention policy (how long a backup is preserved), type of backup (e.g., full backup or incremental backup), type of tape storage devices to use and which specific tape storage devices to use, number of versions of copies of data to be kept on disk-based storage, options for accessing a copy of data at the backup system (e.g., mount point or mount read-only), options relating to failure or inconsistency handling, and so forth. By maintaining the same characteristics, a scheduled backup session runs in the same manner regardless of which storage site the backup session is executing on. To ensure proper operation, the system ensures that there are no invalid configurations or broken scheduled backup sessions. The system also accounts for any sites that are down or are not currently accessible through a network (this can be accomplished, for example, by failing over to a storage site that is available and accessible).

By employing techniques according to some embodiments, the impact on the software application (e.g., database application) of the application system (102A or 102B) during backup and recovery operations is minimized or reduced. Since recovery can be performed from any of the primary storage site or the secondary storage site, by making available both the source data and the backup copy of the source data on each of the primary storage site and secondary storage site, the software application (e.g., database application) in the application system would not have to be brought offline more than once for any scheduled backup session.

In accordance with some embodiments, a cluster-wide view is provided to a user of the various versions of source data. For example, one of the application systems 102A and 102B can provide a graphical user interface (GUI) to allow a user to view the various versions of source data that reside in the storage sites, including the original source storage volume 110A, mirror source storage volume 110B, target storage volume 112A, and target storage volume 112B. Alternatively, the view of the various versions of the source data can be provided at a remote client computer that is connected to one of the application systems 102A, 102B.

A view of the various versions of the source data can identify all of the different versions of the source business data that is presently residing in the storage sites. The various versions of the source data that have been created can be tracked in a consistent manner, and logical connections to the original source data can be maintained. The location and availability of the restorable versions of the source data are also presented to the user, with an indication of which of the storage sites is currently active.

It is noted that in some embodiments, different rule sets may be defined for different source storage volumes. For example, for one source storage volume, a first rule set can be used, where each first rule set can specify the number of versions of the source data that are to be maintained, the backup copy type (snapshot, mirror, etc.), a rule relating to time-shifting the I/O load generated from performing backup to a tape library unit (a delay can be specified for backing up the data to the tape library unit), and other rules.

Figure 2:
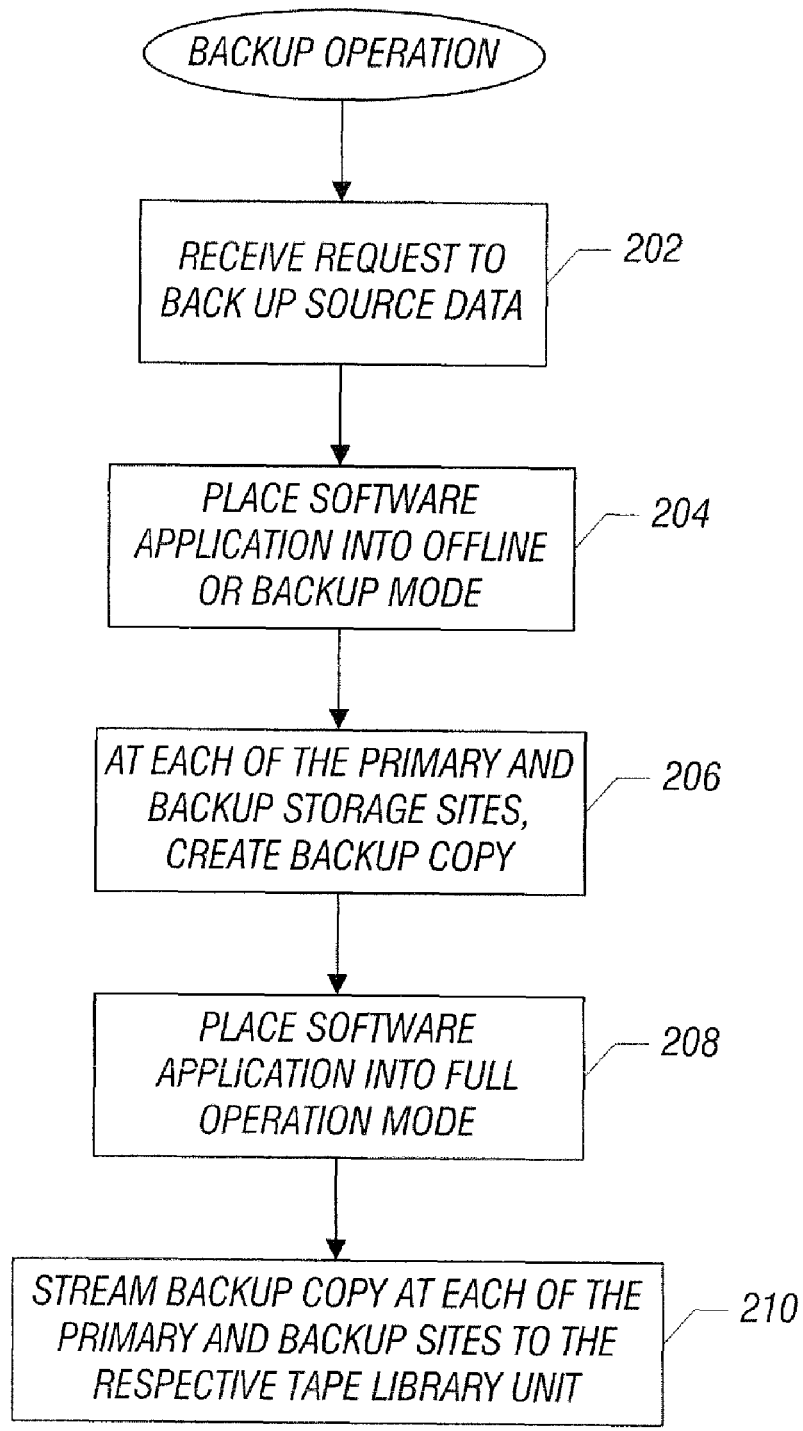
FIG. 2 is a flow diagram of a process of performing data backup according to an embodiment.

FIG. 2 shows a backup operation (performed in a backup session) according to some embodiments. A request is received (at 202) to backup source data. For example, in the context of FIG. 1, the backup system 106A can receive the request to backup source data contained in the storage site 104A, which is assumed to be the primary storage site in this example. In response to the request, the backup system 106A can inform the application system 102A to place its software application into an offline or backup mode (at 204). Offline mode means that the software application is no longer writing data to the original source storage volume (110A). Backup mode means that the software application can continue to access the original source storage volume 110A during the backup session; however, in backup mode, the software application maintains a log of modifications to data in the original source storage volume 110A that were made during the backup session. This log can later be applied (replayed) to update the original source storage volume 110A after the backup session has completed.

Next, at each of the primary and secondary storage sites, a backup copy of the source storage volume is created (at 206). For example, the target source storage volume 112A on the primary storage site 104A is copied from the original source storage volume 110A, whereas the target storage volume 112B on the secondary storage site 104B is copied from the mirror source storage volume 110B. After the backup copies have been created, the software application is placed back into full operation mode (at 208). If tape library units are used, then the backup copies of data at the primary and backup sites can be streamed to the respective tape library units (at 210).

Figure 3:
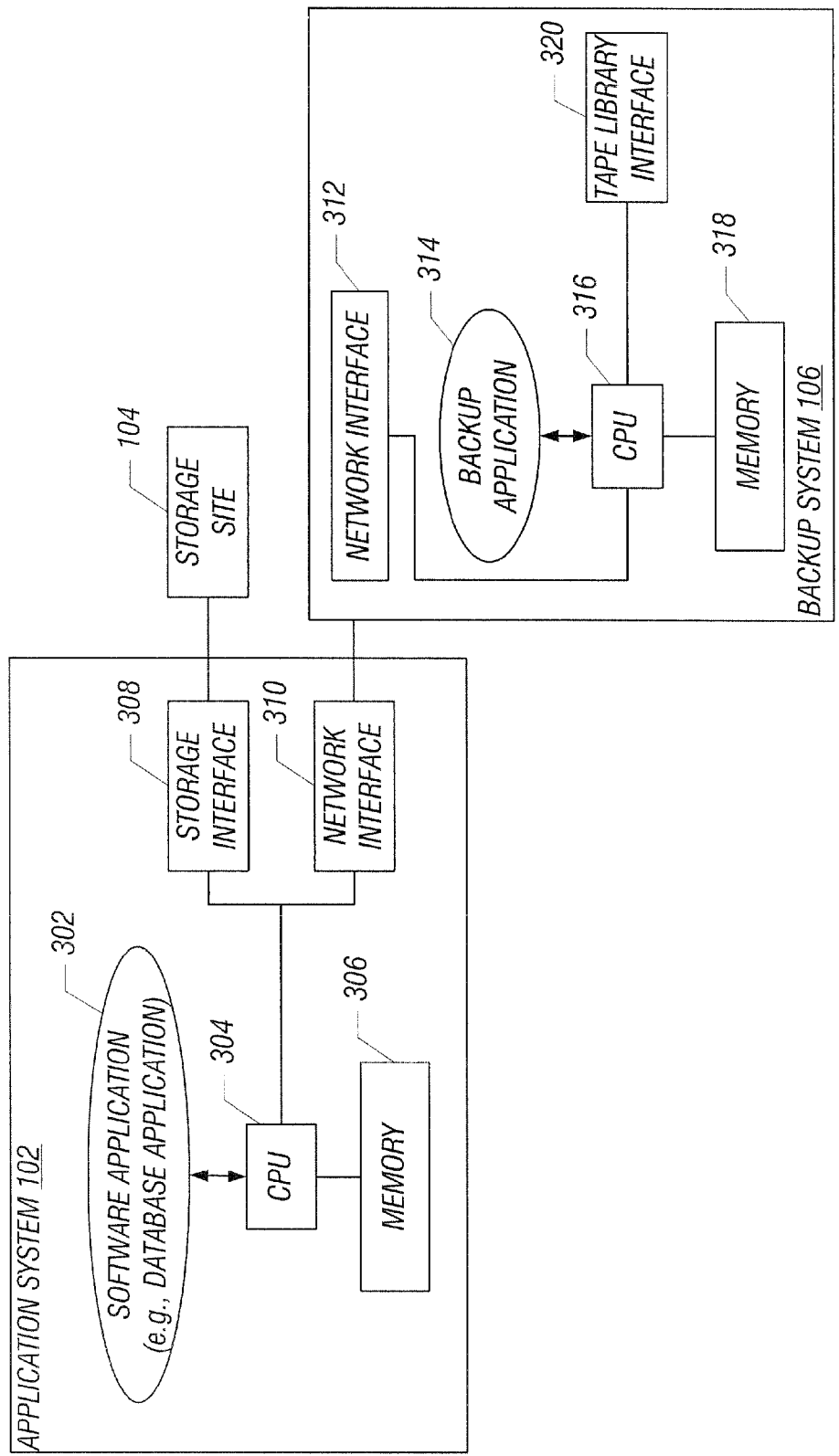
FIG. 3 is a block diagram of components included in an application system and a backup system in the exemplary arrangement of FIG. 1, according to an embodiment.

FIG. 3 shows an exemplary arrangement that includes an application system 102 (application system 102A or 102B in FIG. 1), a backup system 106 (106A or 106B in FIG. 1), and a storage site 104 (storage site 104A or 104B in FIG. 1). The application system 102 includes software application (e.g., database application) 302 that is executable on one or more central processing units (CPUs) 304. The CPU(s) 304 is (are) connected to memory 306. The CPU(s) 304 is (are) also connected to a storage interface 308 that connects to the storage site 104, and a network interface 310 that connects over a network 103 (103A or 103B in FIG. 1) to the backup system 106.

The backup system 106 also includes a network interface 312 for communicating over the network 103. The backup system 106 also includes a backup application 314 executable on one or more CPU(s) 316 that is (are) connected to memory 318 and a tape library interface 320 (for interfacing to a tape library unit 108A or 108B).

Instructions of the software described above (including the software application 302 and backup application 304) are loaded for execution on a processor (such as one or more CPUs 304 and 316). The processor includes microprocessors, microcontrollers, processor modules or subsystems (including one or more microprocessors or microcontrollers), or other control or computing devices. A "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method of making available a backup copy of source data in a multi-site storage system, comprising:
   providing the source data at a first storage site and an operational copy of the source data at a second storage site;
   in response to a request to create a backup copy of the source data, producing the backup copy of the source data at each of the first storage site and second storage site; and
   in response to a failure that causes the first storage site to be unavailable, enabling recovery of a version of the source data based on accessing the backup copy of the source data at the second storage site, and accessing the operational copy of the source data at the second storage site.

2. The method of claim 1, wherein producing the backup copy of the source data comprises producing a point-in-time copy of the source data.

3. The method of claim 1, further comprising:
   failing over from the first storage site to the second storage site in response to failure of the first storage site; and
   accessing the backup copy of the source data at the second storage site and the operational copy of the source data at the second storage site to recover the version of the source data, wherein the backup copy of the source data at the second storage site is accessed due to corruption of the operational copy of the source data.

4. The method of claim 3, further comprising:
   prior to failover from the first storage site to the second storage site, scheduling a backup session at the first storage site to backup the source data;
   after the failover, performing the scheduled backup session at the second storage site without reconfiguring the scheduled backup session.

5. The method of claim 4, wherein not reconfiguring the scheduled backup session allows characteristics of a data backup in the second storage site to be the same as characteristics of a data backup in the first storage site.

6. The method of claim 5, wherein the characteristics are selected from among RAID (Redundant Array of Inexpensive Disks) level, type of copy, schedule, retention policy, type of backup, type of tape storage devices to use and which specific tape storage devices to use, number of versions of copies of data to be kept on disk-based storage, options for accessing a copy of data at a backup system, and options relating to failure or inconsistency handling.

7. The method of claim 1, wherein providing the source data at the first storage site comprises storing the source data in a set of one or more storage devices in the first storage site, and wherein providing the operational copy of the source data at the second storage site comprises storing the operational copy of the source data in a set of one or more storage devices in the second storage site,
   wherein producing the backup copy at each of the first and second storage sites comprises storing the backup copy in the set of the one or more storage devices in the first storage site, and storing the backup copy in the set of the one or more storage devices in the second storage site.

8. The method of claim 7, wherein producing the backup copy at each of the first and second storage sites comprises performing zero downtime backup.

9. The method of claim 7, further comprising:
   copying each of the backup copies at the first and second storage sites to respective tape storage devices.

10. The method of claim 1, further comprising presenting, for display, a view of various versions of the source data including the source data, the operational copy of the source data, and the backup copies of the source data at the first and second storage sites.

11. The method of claim 1, wherein producing the backup copy of the source data occurs in a backup session during which an application that accesses the source data is taken offline.

12. The method of claim 1, wherein producing the backup copy of the source data occurs in a backup session during which an application that accesses the source data remains online.

13. The method of claim 1, further comprising receiving the request at the first storage site, wherein producing the backup copy of the source data at each of the first storage site and the second storage site is in response to the request received at the first storage site.

14. The method of claim 1, further comprising, in response to the failure, recovering the version of the source data by accessing both the backup copy of the source data at the second storage site, and accessing the operational copy of the source data at the second storage site.

15. The method of claim 1, wherein the request is a single request to create a backup copy of the source data, and wherein producing the backup copy of the source data at each of the first storage site and the second storage site is in response to the single request.

16. A system comprising:
   an application system containing an application;
   a first storage site having a storage subsystem and a second storage site having a storage subsystem, the first storage site configured to store source data and the second storage site configured to store an operational copy of the source data; and
   at least one backup system configured to:
      create backup copies of the source data at both the first and second storage sites in response to a request to back up the source data, and
      recover a version of the source data from the operational copy of the source data and the backup copy stored at the second storage site.

17. The system of claim 16, wherein the at least one backup system is configured to create the backup copy of the source data in the first storage site by locally copying the source data in the first storage site, and create the backup copy of the source data in the second storage site by locally copying the operational copy of the source data.

18. The system of claim 16, wherein the at least one backup system includes a first backup system at the first storage site, and a second backup system at the second storage site, wherein the first backup system is to receive the request to back up the source data, and to cause creation of the backup copies of the source data at both the first and second storage sites in response to the received request.

19. An article comprising at least one computer-readable storage medium containing instructions that when executed cause a storage system to:
store source data in a first storage site and store an operational copy of the source data in a second storage site;
in response to a request to back up the source data, store a first backup copy of the source data in the first storage site and a second backup copy of the source data in the second storage site; and
in response to a failure that causes the first storage site to be unavailable, recover a version of the source data by restoring from the operational copy of the source data and the second backup copy in the second storage site.

20. The article of claim 19, wherein the instructions when executed cause the storage system to further:
receive the request at the first storage site, wherein storing the first backup copy of the source data at the first storage site and the second backup copy of the source data at the second storage site is in response to the request received at the first storage site.

* * * * *